(12) United States Patent
Takeishi et al.

(10) Patent No.: US 7,171,799 B2
(45) Date of Patent: Feb. 6, 2007

(54) LAWN MOWER

(75) Inventors: Masanori Takeishi, Ormes-Loire (FR); Tommy Plouraboue, Ormes-Loire (FR); Dominique Vougier, Ormes-Loire (FR); Cyril Perotin, Ormes-Loire (FR)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/216,390

(22) Filed: Aug. 31, 2005

(65) Prior Publication Data

US 2006/0042219 A1 Mar. 2, 2006

(30) Foreign Application Priority Data

Sep. 2, 2004 (JP) ............................. 2004-256004

(51) Int. Cl.
*A01D 67/00* (2006.01)
(52) U.S. Cl. ............................. 56/320.1; 56/DIG. 20
(58) Field of Classification Search ............... 56/320.1, 56/1, DIG. 20
See application file for complete search history.

(56) References Cited

U.S. PATENT DOCUMENTS

| | | | | |
|---|---|---|---|---|
| 3,646,739 A | * | 3/1972 | Dahl | 56/320.1 |
| 4,307,563 A | * | 12/1981 | Fuelling et al. | 56/320.2 |
| 4,711,077 A | * | 12/1987 | Kutsukake et al. | 56/320.2 |
| 4,899,526 A | * | 2/1990 | Harris | 56/320.2 |
| 5,884,466 A | * | 3/1999 | Willmering et al. | 56/320.1 |
| 6,735,932 B2 | * | 5/2004 | Osborne | 56/320.1 |

FOREIGN PATENT DOCUMENTS

JP 440433 6/1987

* cited by examiner

*Primary Examiner*—Thomas B. Will
*Assistant Examiner*—Alicia Torres
(74) *Attorney, Agent, or Firm*—Adams & Wilks

(57) ABSTRACT

A lawn mower having a cutter housing made of a synthetic resin. The cutter housing has side guard parts provided on left and right peripheries of a scroll part. Each side guard part has a hollow reinforcing part. The hollow reinforcing part is made up of a side wall of the scroll part, an approximately horizontal guard wall formed on the side wall, and a connecting rib connecting together the guard wall and the side wall. The reinforcing part makes the cutter housing resistant to impacts from the sides and to bending with respect to its length direction.

10 Claims, 12 Drawing Sheets ional guard wall extending outward from the vicinity of a lower end of a side wall of the scroll part and in a front-rear direction, a vertical guard wall extending downward from the horizontal guard wall and in the front-rear direction, and a connecting rib connected between the side wall and the horizontal guard wall and extending in the front-rear direction, and by the side wall, the horizontal guard wall and the connecting rib a hollow reinforcing part is formed in the vicinity of the lower end of the side wall.

LAWN MOWER

FIELD OF THE INVENTION

This invention relates to a lawn mower in which a cutter housing made of resin is used, a cutter blade is rotated inside this cutter housing, and a grass lawn surface can be cut with this cutter blade.

BACKGROUND OF THE INVENTION

When work is carried out using a lawn mower, normally, it is carried out with all of four wheels mounted on a cutter housing in contact with the ground. However, sometimes, to mount or dismount a place where there is a step, or to shake cut grass adhered to parts inside the cutter housing off onto the ground surface, a movement of lifting the front wheels about the rear wheels as a pivot is carried out. When this movement is carried out, an external force tending to bend the cutter housing in the length direction acts.

With respect to an external force of this kind, in a cutter housing made of resin, due to the rigidity and strength characteristics of the material, it is not possible to obtain adequate rigidity and strength.

In this connection, a lawn mower in which reinforcing ribs are formed in a resin cutter housing to provide the cutter housing with the necessary rigidity has been proposed, for example in JP-UM-B-4-40433.

This lawn mower of related art will now be described on the basis of FIG. 14 and FIG. 15 hereof.

The lawn mower 250 of related art shown in FIG. 14 has an engine 252 mounted on the top of a cutter housing 251. As shown in FIG. 15, a cutter blade 254 is attached to the output shaft 253 of the engine 252. A handle 255 (see FIG. 14) extends rearward from the cutter housing 251. Front wheels 256, 256 and rear wheels 257, 257 are attached to the cutter housing 251. The lawn mower 250 travels on these front wheels 256, 256 and rear wheels 257, 257 and cuts grass with the cutter blade 254. Flange parts 258, 258 are formed on the sides of the cutter housing 251. These flange parts 258, 258 have multiple reinforcing ribs 259, whereby the impact-resistance of the left and right side faces of the cutter housing 251 is increased.

However, in the lawn mower 250, because the multiple reinforcing ribs 259 are formed on the flange parts 258, 258, although they are strong with respect to impacts from the sides of the cutter housing 251, there has been the shortcoming that they make no contribution to the length-direction bending rigidity of the cutter housing 251. And it has also been the case that mud or cut grass enters between the reinforcing ribs 259, and this mud or cut grass has to be removed every time mowing work is carried out, so that the ease of maintenance of the lawn mower 250 is reduced.

Accordingly, a lawn mower has been awaited with which it is possible to increase the length-direction bending rigidity of the cutter housing and it is possible to increase the resistance to impacts from the sides of the cutter housing.

SUMMARY OF THE INVENTION

The present invention provides a lawn mower having a cutter housing, a motive power source mounted on the cutter housing, and a cutter blade attached to the end of the output shaft of the motive power source horizontally and rotatably in a scroll part of the cutter housing, wherein the cutter housing is made of a synthetic resin and has side guard parts respectively on left and right peripheries of the scroll part, each of the side parts is made up of a substantially horizontal guard wall extending outward from the vicinity of a lower end of a side wall of the scroll part and in a front-rear direction, a vertical guard wall extending downward from the horizontal guard wall and in the front-rear direction, and a connecting rib connected between the side wall and the horizontal guard wall and extending in the front-rear direction, and by the side wall, the horizontal guard wall and the connecting rib a hollow reinforcing part is formed in the vicinity of the lower end of the side wall.

Because on the left and on the right of the cutter housing respectively there is formed a side guard part made up of a substantially horizontal guard wall extending outward from the lower end vicinity of the side wall of the scroll part and in the front-rear direction, a vertical guard wall extending downward from the horizontal guard wall and in the front-rear direction, and a connecting rib connected between the side wall and the horizontal guard wall and extending in the front-rear direction, a hollow reinforcing part constituted by the side wall, the horizontal guard wall and the connecting rib can be formed in the vicinity of the lower end of the side wall, the resistance of the cutter housing to impacts from the sides can be increased, and the length-direction bending rigidity of the cutter housing can also be increased. Thus, overall rigidity of the lawn mower can be obtained.

Gas is filled into the hollow reinforcing part.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

Figure 1:
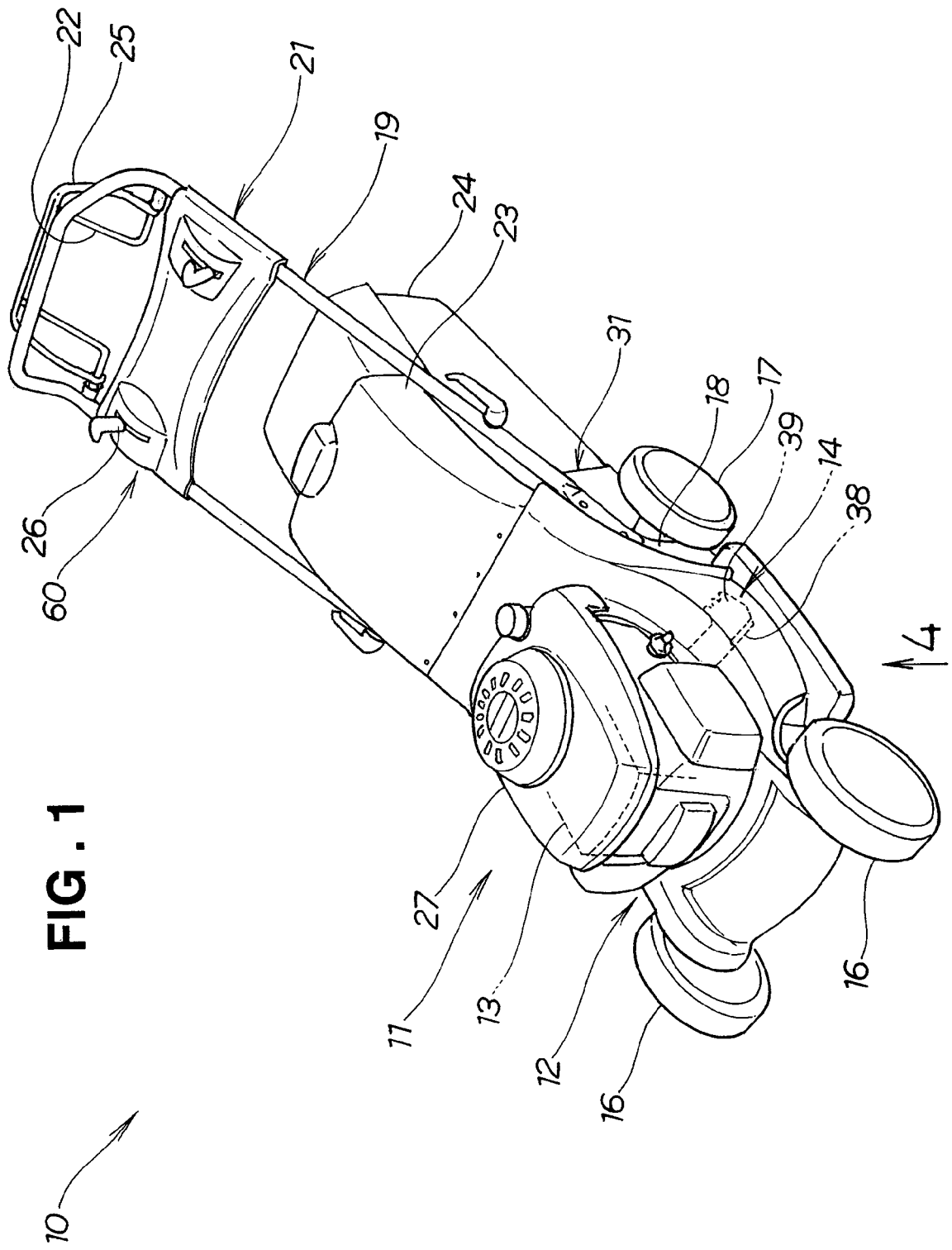
FIG. 1 is a perspective view of a lawn mower according to the present invention.

A lawn mower 10 constituting a preferred embodiment of the invention shown in FIG. 1 is of a self-propelling type. A cutter blade 14 for cutting grass is rotated by an engine 13, which is a motive power source. Cut grass is collected by being carried from a cutter housing 12 by a carrying draft into a grass bag 24. Rear wheels 17 are driven by the engine 13.

In the figure, the reference number 11 denotes a machine body; 16 front wheels; 18 handle stays; 19 a handle; 21 a handle cover extending across the handle 19; 22 a clutch lever for travel, which clutch-controls motive power transmission from the engine 13 to the rear wheels 17; 23 a grass cover; 25 a clutch lever for clutch-controlling rotational power to the cutter blade 14; 26 a lock lever; 27 a head cover; and 60 a lock mechanism.

The clutch lever 25 is a lever that simultaneously performs an operation of applying a brake to the cutter blade 14 while stopping the driving of the cutter blade 14, and is sometimes called a BBC control lever because it controls a blade, a brake and a clutch (BBC).

Figure 2:
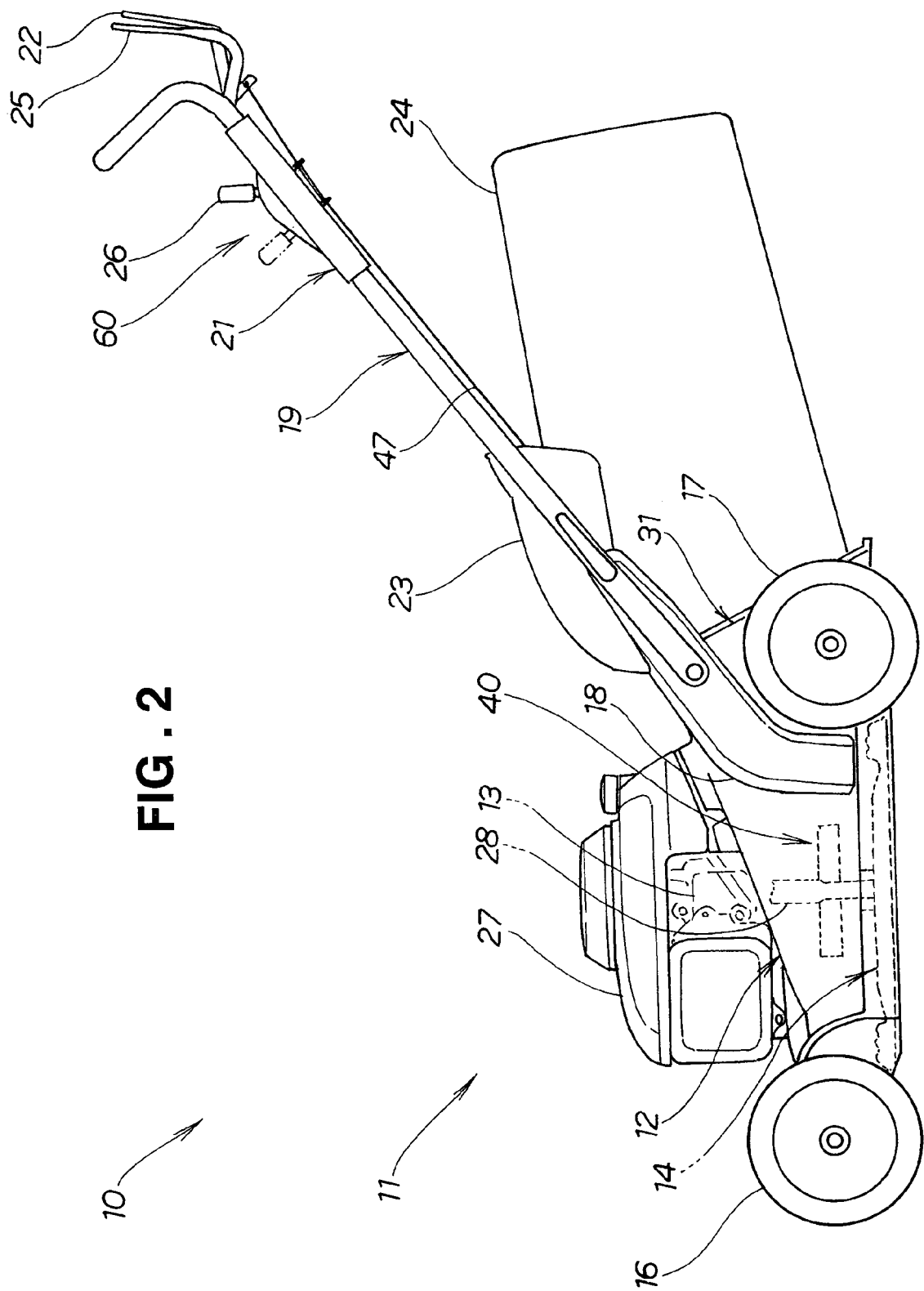
FIG. 2 is a side view of the lawn mower shown in FIG. 1.

As shown in FIG. 2, the engine 13 of the lawn mower 10 is mounted on the top of the cutter housing 12. The cutter blade 14 is attached to the output shaft 28 of the engine 13 by way of a clutch mechanism 40. The left and right front wheels 16 are disposed at side faces of the front part of the cutter housing 12, and the left and right rear wheels 17 are disposed at side faces of the rear part of the cutter housing 12. Left and right handle stays 18 are attached to the side faces of the rear part of the cutter housing 12. The handle 19 extends rearward from the rear parts of these handle stays 18, 18. The clutch lever 25 is mounted on this handle 19 and controls the clutch mechanism 40. The lock lever 26 is mounted in front of the clutch lever 25 and bars an engaging function of the clutch lever. The grass bag 24 is removably attached to a rear wall 31 of the cutter housing 12. A grass guard 23 is swingably attached to an upper part of the rear wall 31 of the cutter housing 12.

The grass bag 24 is made of a porous material having plural air holes (not shown) through which the carrying draft can pass but grass cuttings cannot pass.

Figure 3:
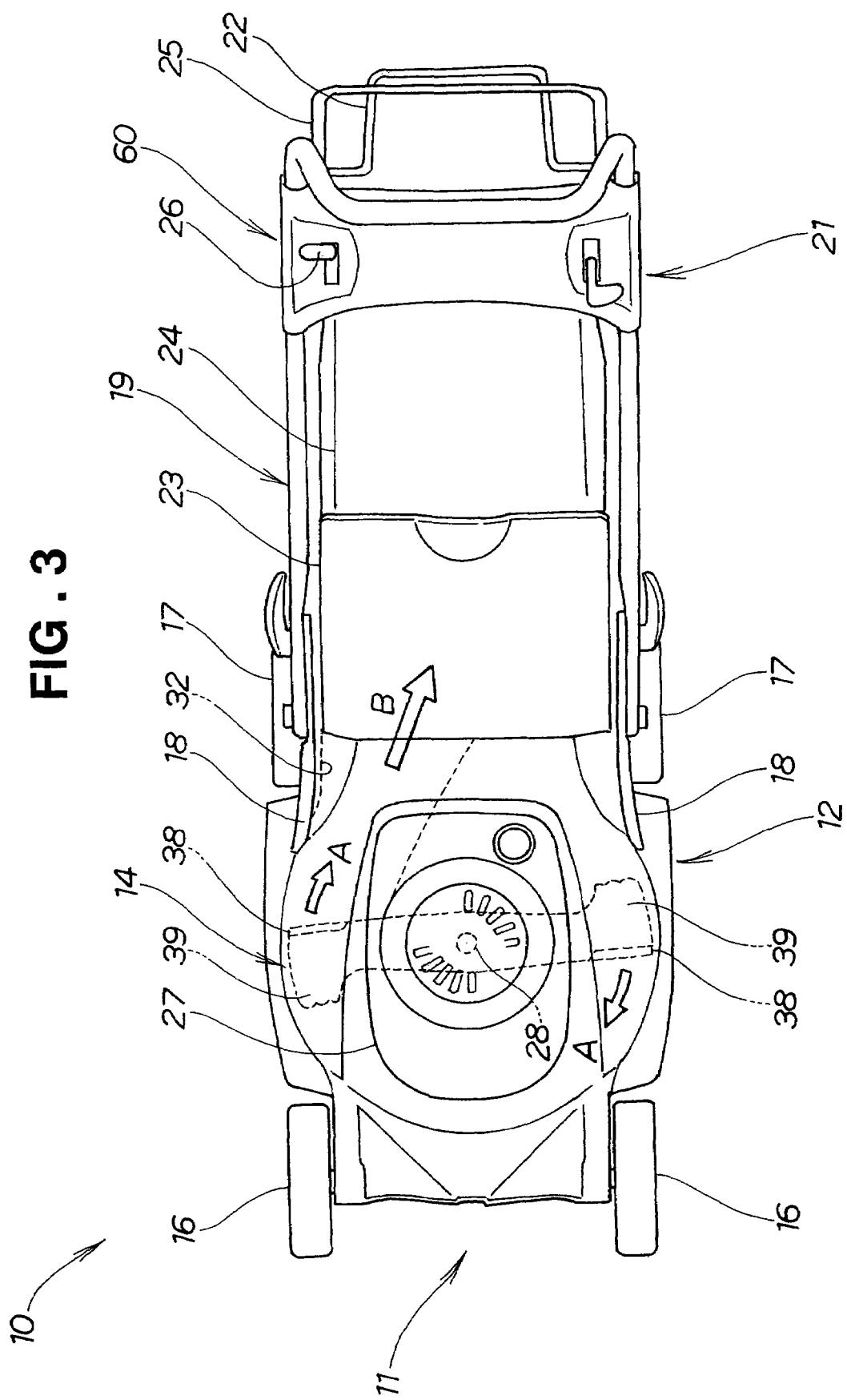
FIG. 3 is a plan view of the lawn mower shown in FIG. 1.

As shown in FIG. 3, with the engine 13 (see FIG. 2) started, the clutch mechanism 40 (see FIG. 2) is switched from an off state to an engaged state by a two-stage motion of shifting the clutch lever 25 to the handle 19 side and then shifting the lock lever 26 forward, to rotate the cutter blade 14, and the clutch lever for travel 22 is shifted to the handle 19 side to rotate the rear wheels 17, 17.

The cutter blade 14 has blade parts 38, 38 on its leading sides in the rotation direction shown with the arrows A, A, and from these blade parts 38, 38 on its trailing sides in the rotation direction it has air-lifting parts 39, 39 formed so as to curve upward.

That is, as the cutter blade 14 rotates, grass on the ground surface is caused to stand up by a negative pressure arising on the undersides of the air-lifting parts 39, 39, and the grass is cut by the blade parts 38, 38. The cut grass is hit by the upper sides of the air-lifting parts 39, 39 and caught by a swirling airflow created by the rotation of the cutter blade 14, and with this swirling airflow as a carrying draft the grass cuttings are fed together with the carrying draft through a cut grass carrying passage 32 into the grass bag 24 as shown by the arrow B.

Figure 4:
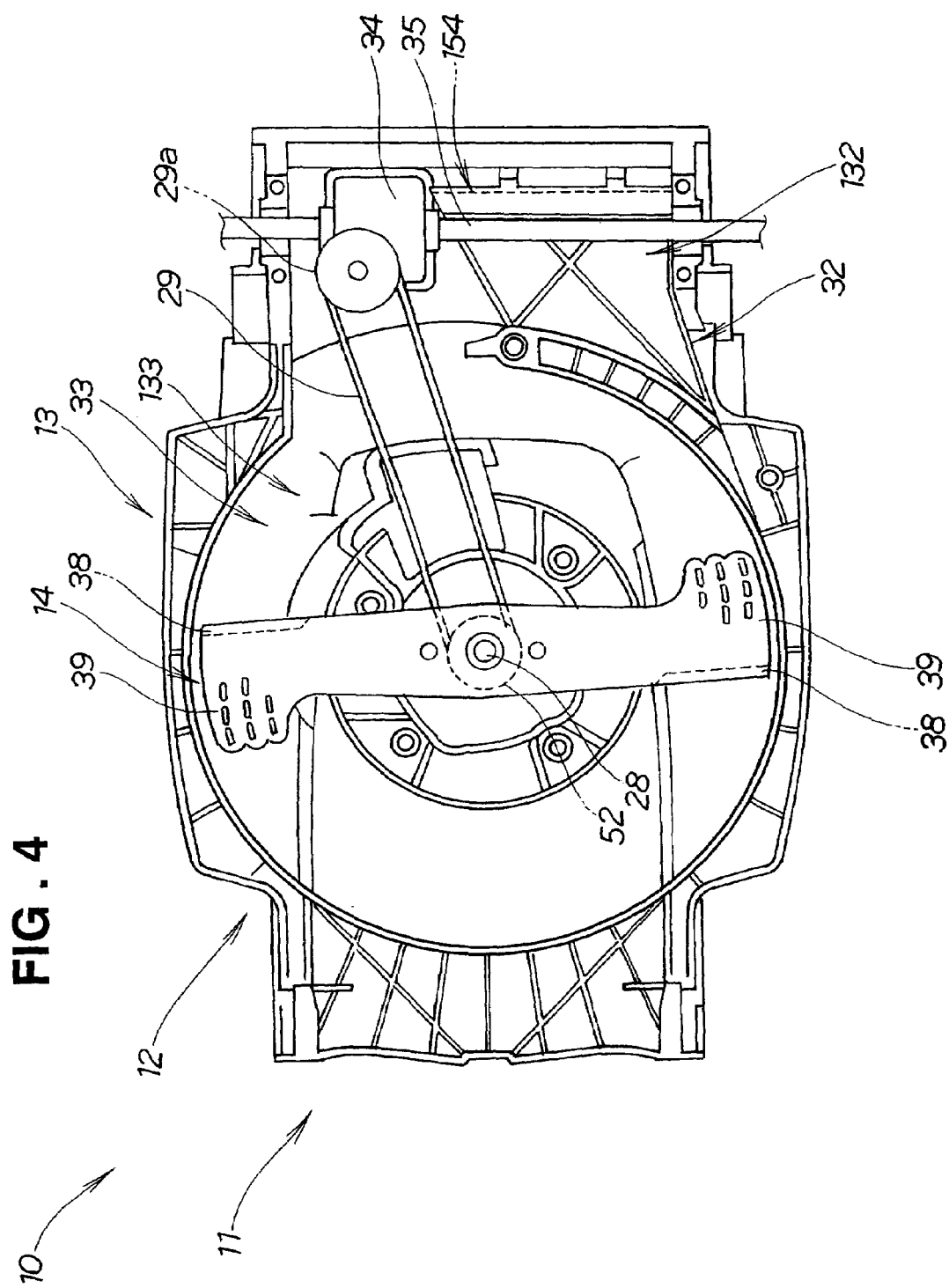
FIG. 4 is a view in the direction of the arrow 4 in FIG. 1.

FIG. 4 shows the underside of the lawn mower 10.

The cutter blade 14 is covered by the cutter housing 12. The cut grass carrying passage 32 for guiding cut grass into the grass bag 24 (see FIG. 2) is formed in the cutter housing 12. This cut grass carrying passage 32 connects with the grass bag 24.

The reference number 29 denotes a power-transmitting part (a belt); 33 a scroll part provided in the cutter housing 12 for rotatably receiving the cutter blade 14; 52 a drive pulley; 34 a clutch for travel; and 35 a rear wheel axle.

In the lawn mower 10, the output of the engine 13 is transmitted from the drive pulley 52 of the output shaft 28 to a driven pulley 29a by the belt 29, and by way of the driven pulley 29a and the clutch for travel 34 the output of the engine 13 is transmitted to the rear wheel axle 35 and drives the rear wheels 17, 17 (see FIG. 3).

Figure 5:
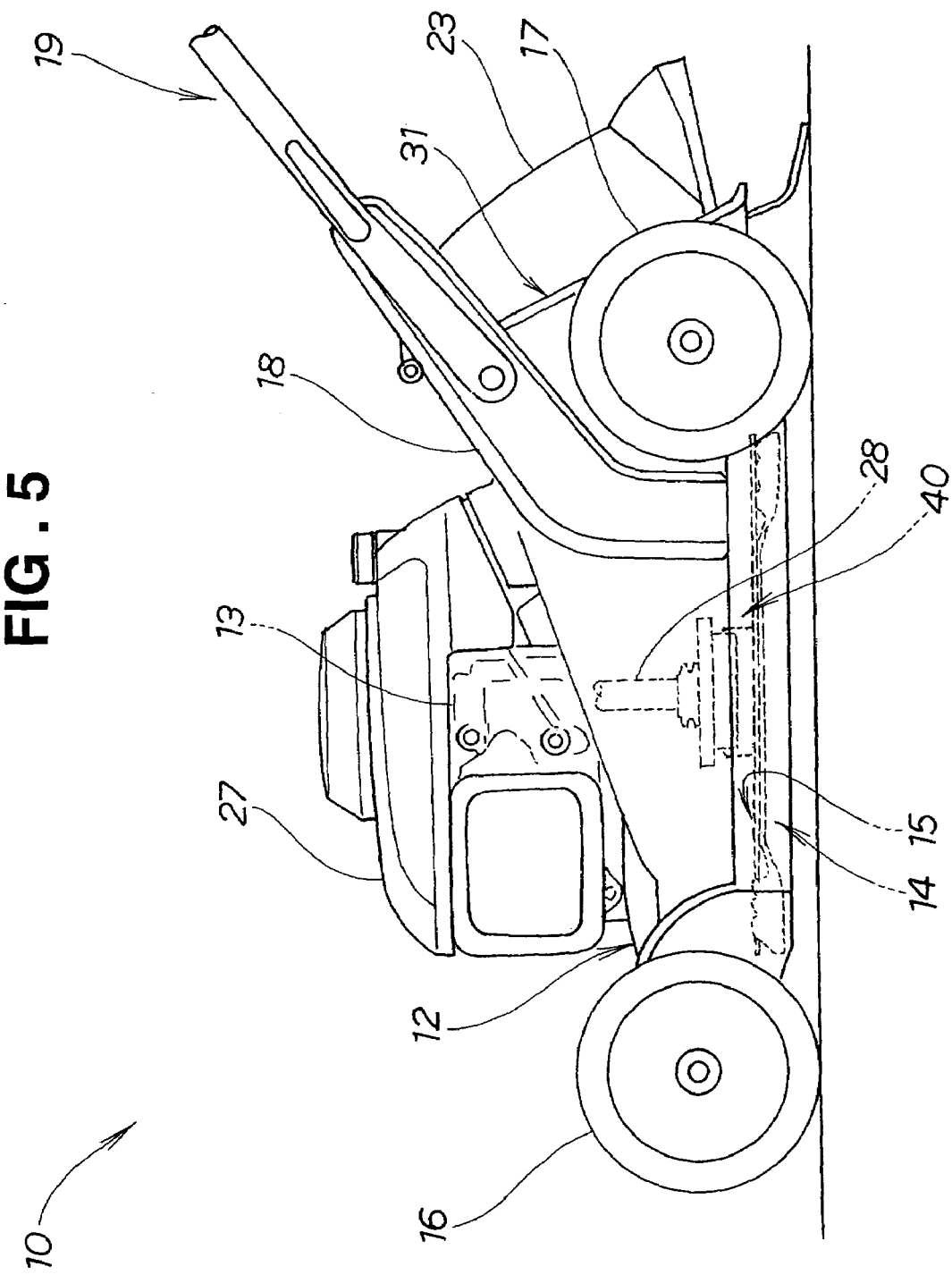
FIG. 5 is a side view showing a mulching work state of the lawn mower shown in FIG. 1.

FIG. 5 shows a mulching work state of the lawn mower. Mulching work (mulching mode) is a working mode in which two cutter blades are provided in the cutter housing, grass is cut with these cutter blades, and finely cut grass cuttings are dispersed on the lawn surface (ground surface) so that they are inconspicuous. Mulching work is an alternative mode of discharge work, discussed below.

Discharge work (discharge mode) is a working mode in which grass is cut with one cutter blade, and the cut grass is made to pass through the cut grass carrying passage and discharged to outside through the grass cover.

Bagging work (bagging mode) is a working mode in which grass is cut with one cutter blade and the cut grass is made to pass through the cut grass carrying passage and collected in the grass bag.

That is, the lawn mower 10 of this preferred embodiment is capable of mulching work, discharge work and bagging work (see FIG. 2). When mulching work is to be done, an upper cutter blade 15 for mulching work is fitted to the output shaft 28 of the engine 13 along with a cutter blade 14 for discharge work and bagging work, and a dosing member (not shown) is placed in the cut grass carrying passage 32 (see FIG. 4) for performance of operations.

Figure 6:
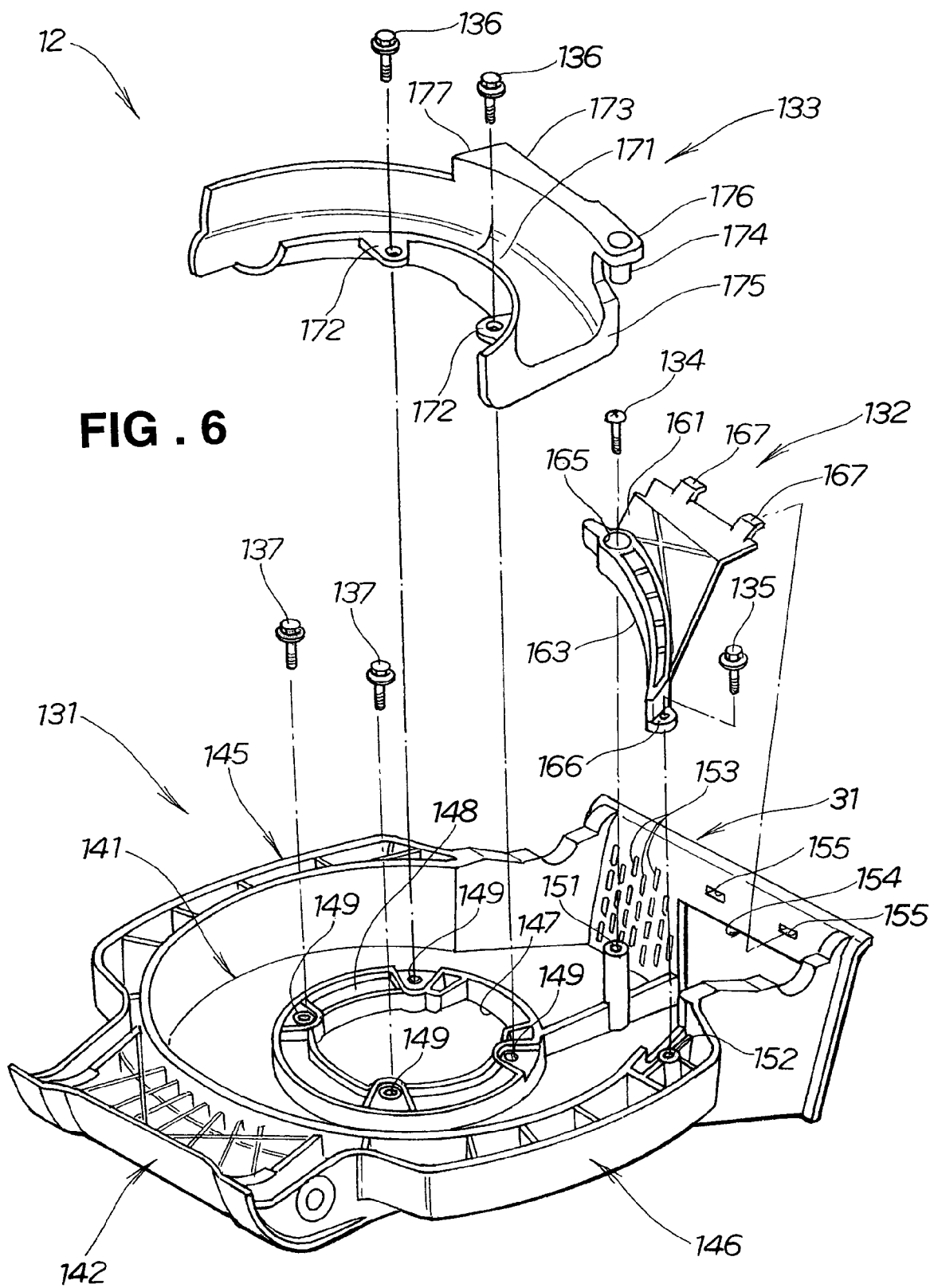
FIG. 6 is an exploded perspective view of a cutter housing according to the invention.
Figure 7:
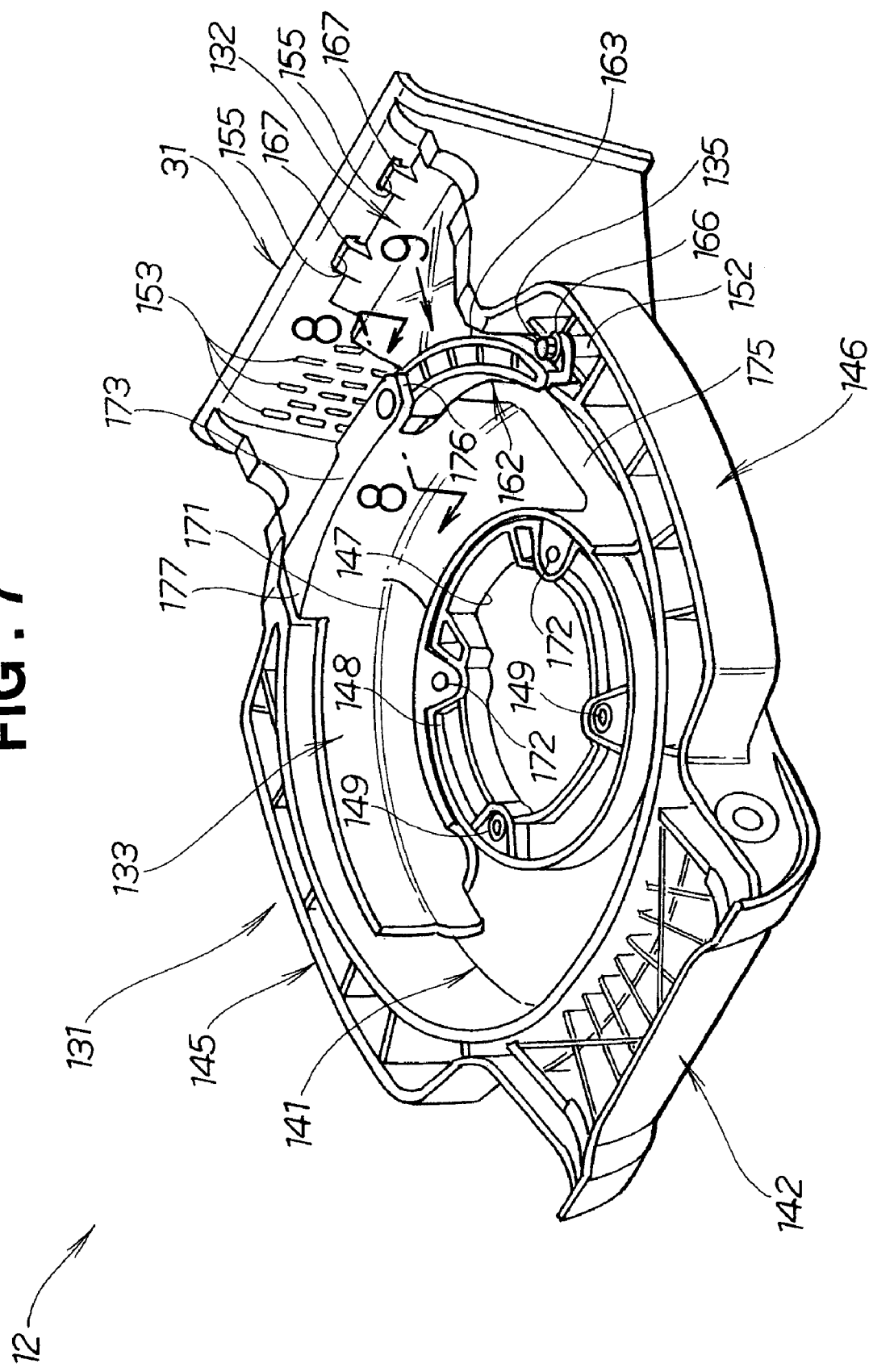
FIG. 7 is a perspective view of the cutter housing shown in FIG. 6 in an assembled state.

FIG. 6 and FIG. 7 show a cutter housing 12 according to the invention in an upside-down state.

The cutter housing 12 is made up of a housing proper 131 for receiving the cutter blade 14; a bottom member 132, attached to this housing proper 131, for forming the cut grass carrying passage 32 (see FIG. 4); and a scroll guide member 133, attached to the housing proper 131, for forming the scroll part 33 (see FIG. 4). This cutter housing 12 is made of a resin material.

The bottom member 132 is attached to the housing proper 131 by fixing screws 134, 135. The scroll guide member 133 is co-fastened to the cutter housing 12 and the engine 13 (see FIG. 1) with fixing screws 136, 136.

The reference numbers 137, 137 denote fixing screws for fixing the engine 13 to the cutter housing 12.

The housing proper 131 has a housing concavity 141 forming the cut grass carrying passage 32 and the scroll part 33 shown in FIG. 4. A front guard part 142 is formed at the front of this housing concavity 141. A rear wall 31 is formed at the rear of the housing concavity 141. Left and right side guard parts 145, 146 are formed at the left and right sides of the housing concavity 141.

The output shaft 28 of the engine 13 and the clutch mechanism 40 shown in FIG. 2 are passed through a top opening 147 formed in the center of the housing concavity 141.

An engine mount part 148 for the engine 13 to be mounted to is formed around the top opening 147. The engine 13 is mounted to the engine mount part 148 using the fixing screws 136, 137 and a plurality of fixing holes 149 formed in the engine mount part 148.

An inner mounting boss 151 for mounting the bottom member 132 to the housing proper 131 is formed in the housing concavity 141. Also, an outer mounting boss 152 for mounting the bottom member 132 to the housing proper 131 is formed on the right side guard part 146.

Multiple internal pressure control holes 153 for controlling the internal pressure of the cut grass collecting unit 24 (see FIG. 2) are formed in the left side of the rear wall 31. A cut grass carrying passage exit 154 (exit-side opening) is formed in the right side of the rear wall 31. Engaging holes 155, 155 for engaging with the bottom member 132 are also formed in the right side of the rear wall 31.

The bottom member 132 has a body part 161 for forming the bottom of the cut grass carrying passage 32 (see FIG. 4); an entrance-side reinforced part 163 formed at the front of the body part 161 so that it forms a flange in the shape of an arc of the scroll part 33 (see FIG. 4) and completes a cut grass carrying passage entrance 162 (see FIG. 7); an inner mounting part 165, formed at the inner end of this entrance-side reinforced part 163, to be fixed to the inner mounting boss 151; an outer mounting part 166, formed at the outer end of the entrance-side reinforced part 163, to be fixed to the outer mounting boss 152; and projections 167, 167, formed at the rear of the body part 161, to fit in the engaging holes 155, 155 formed in the rear wall 31.

The entrance-side reinforced part 163 has the function of completing the vertical wall of the scroll part 33.

The scroll guide member 133 has an arcuate scroll channel 171 through which an approximate sectional U-shape forming the scroll part 33 (see FIG. 4) continues. The scroll guide member 133 is co-fastened to the housing proper 131 along with the engine 13 through co-fastening parts 172, 172 formed at the inner periphery of this scroll channel 171. A flange part 173 formed on the outer periphery of the scroll channel 171 forms an arcuate flange of the scroll part 33. The flange part 173 has a boss part 174 formed at one end 176 of it. The boss part 174 is fitted (press-fitted) in the inner mounting part 165 of the bottom member 132. A carrying passage side face part 175 forming a part of a side face of the cut grass carrying passage 32 is formed at the end 176 of the scroll channel 171.

The reference number 177 denotes the other end of the flange part 173.

Also, to obtain the ideal (desired) shape of the scroll guide member 133, the scroll guide member 133 is positioned at the lowest position of the cut grass carrying passage entrance 162 of the cut grass carrying passage 32 and is formed in a shape continuous with the housing proper 131 at the vicinity of the maximum width of the cutter housing 12.

Because the cutter housing 12 is divided into the housing proper 131, the bottom member 132 and the scroll guide member 133 like this, simplification of dies for molding the one-piece members constituting the cutter housing 12 is achieved and the manufacturability of the cutter housing 12 can be improved.

Because the projections 167, 167 formed on the bottom member 132 are engaged with the engaging holes 155, 155 formed in the rear wall 31 of the housing proper 131, the ease of assembly of the bottom member 132 to the housing proper 131 is improved.

And because the scroll guide member 133 is co-fastened to the engine 13 and the housing proper 131, notwithstanding the increase in the number of parts arising from the division of the cutter housing 12 into a plurality of members, as mentioned above, there is no increase in the number of fixing screws.

Figure 8:
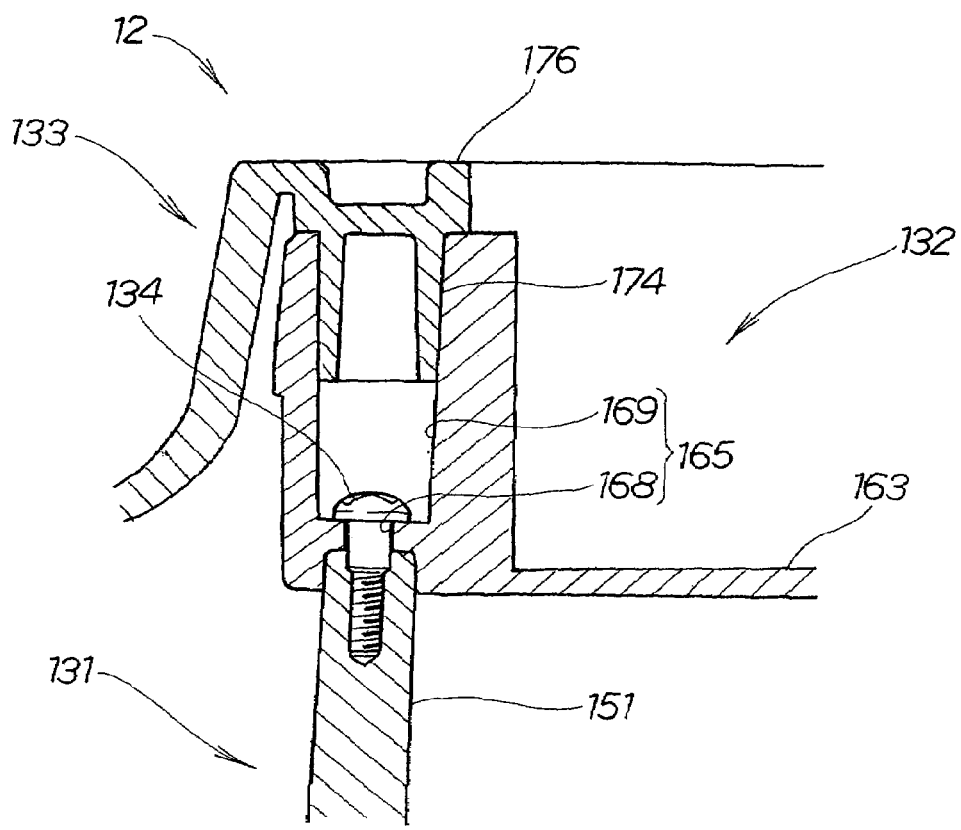
FIG. 8 is a sectional view taken along line 8—8 of FIG. 7.

As shown in FIG. 8, the inner mounting part 165 of the bottom member 132 has a through hole 168 for a fixing screw 134 to pass through and a mating tubular part 169 for the boss part 174 of the scroll guide member 133 to mate with.

As a result of the entrance-side reinforced part 163 of the bottom member 132 being fixed to the housing proper 131 and the boss part 174 of the scroll guide member 133 being mated with the mating tubular part 169, the ease of assembly of the bottom member 132 and the scroll guide member 133 improves.

Figure 9:
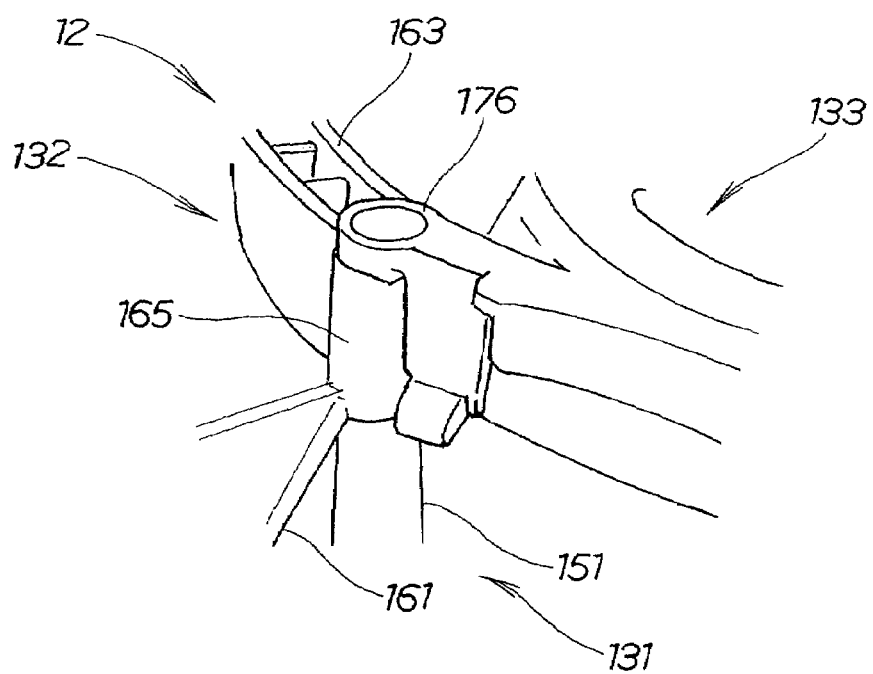
FIG. 9 is a view in the direction of arrow 9 of FIG. 7.

As shown in FIG. 9, by the inner mounting part 165 of the bottom member 132 being fixed to the inner mounting boss 151 of the housing proper 131 and the boss part 174 of the scroll guide member 133 being fitted (press-fitted) into the mating tubular part 169 (see FIG. 8) of this inner mounting part 165, the two members that are the bottom member 132 and the scroll guide member 133 can be supported on the one inner mounting boss 151. Also, the entrance-side reinforced part 163 of the bottom member 132 and the scroll guide member 133 are assembled in a continuous arc shape so as to allow rotation of the cutter blade 14 (see FIG. 4).

Figure 10:
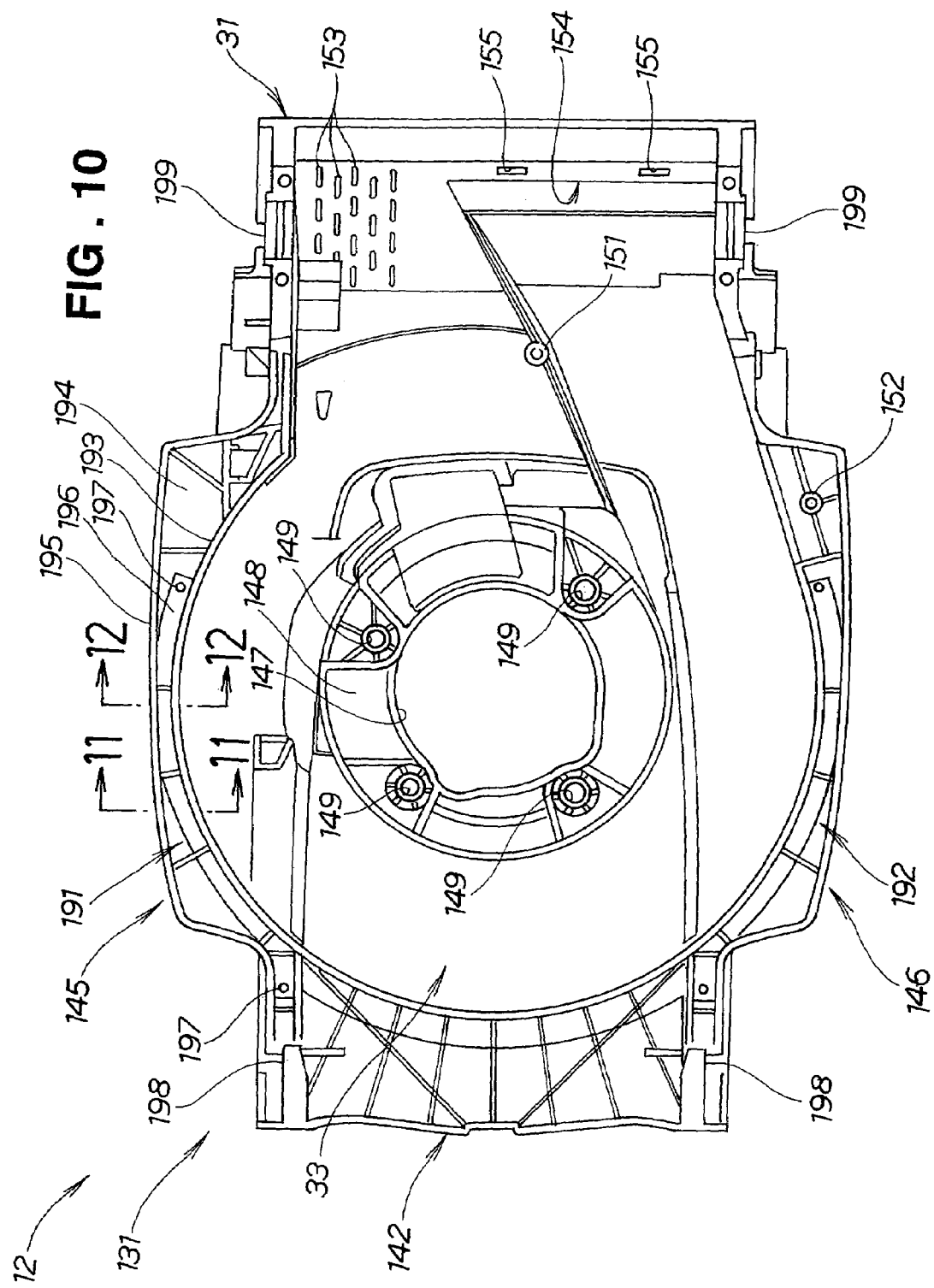
FIG. 10 is a bottom view of a housing proper of a cutter housing according to the invention.

FIG. 10 shows a housing proper as seen from the underside of a cutter housing according to the invention.

The cutter housing 12 has front wheel support parts 198, 198 for supporting the front wheels 16, 16 shown in FIG. 3 formed at its front end and rear wheel support parts 199, 199 for supporting the rear wheels 17, 17 formed at its rear end. The front wheel support parts 198, 198 and the rear wheel support parts 199, 199 contribute to an increase in the rigidity of the cutter housing 12.

Generally, to increase the maneuverability (the mowability) of the lawn mower 10 (see FIG. 2), it is necessary to make the width of the machine body 11 narrow. In the curved side wall 193 part of the scroll part 33 there are few portions that constribute to the rigidity of the cutter housing 12, and there are few portions reinforcing or protecting the cutter housing 12. Therefore, there is a need to increase the rigidity of the cutter housing 12 without widening the width of the left and right side guard parts 145, 146 of the machine body 11.

For the left side guard part 145, gas injection is used. That is, an enclosed hollow reinforcing part 191 is formed in the front-rear direction of the machine body 11 (see FIG. 2) and filled with gas, and this increases the resistance of the cutter housing 12 to impacts from the side and the length-direction bending rigidity of the cutter housing 12. Consequently, when the machine body 11 (see FIG. 2) is turned during mowing work, even when an operation of pushing the handle 19 (see FIG. 2) down and lifting up the front wheels 16, 16 about the rear wheels 17, 17 as a pivot is carried out, bending of the cutter housing 12 is kept to a minimum.

The right side guard 146 has a structure having enclosed hollow reinforcing part 192 approximately symmetrical with the left side guard part 145, and a detailed description of it will be omitted. The reference numbers 197, 197 show gas injection holes for injecting gas into the enclosed hollow reinforcing structures 191 and 192.

Figure 11:
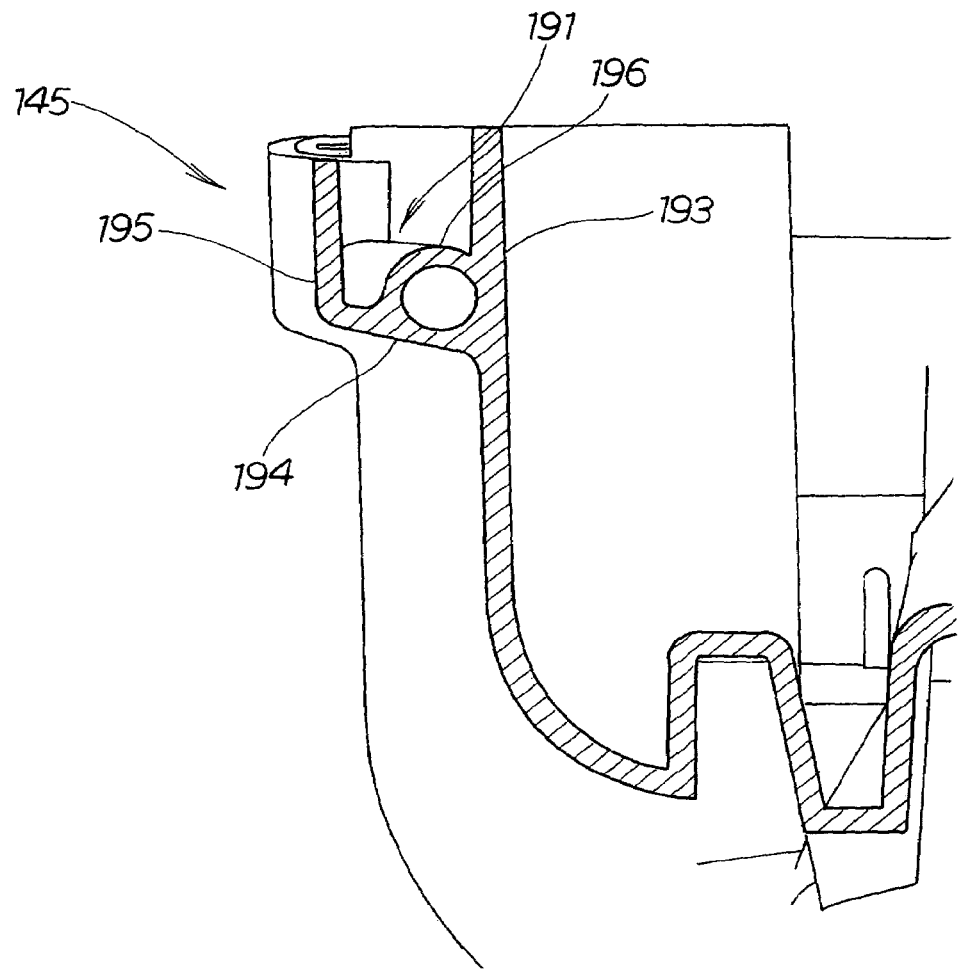
FIG. 11 is a sectional view taken along line 11—11 of FIG. 10.
Figure 12:
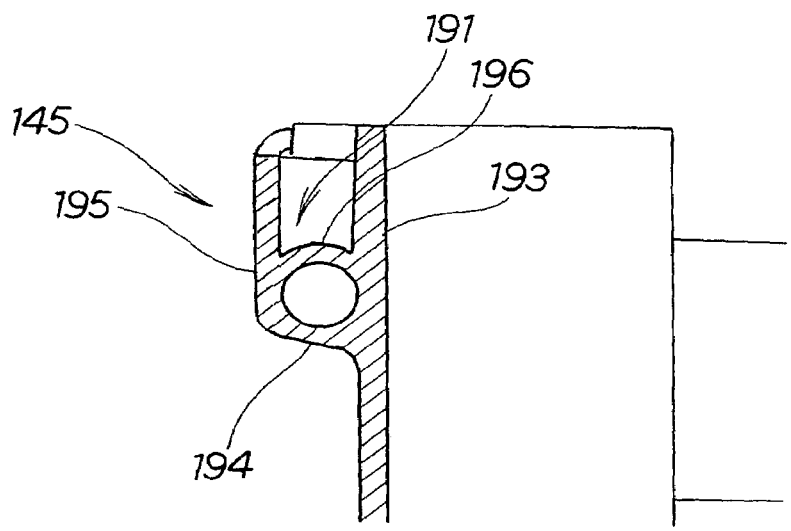
FIG. 12 is a sectional view taken along line 12—12 of FIG. 10.
Figure 13:
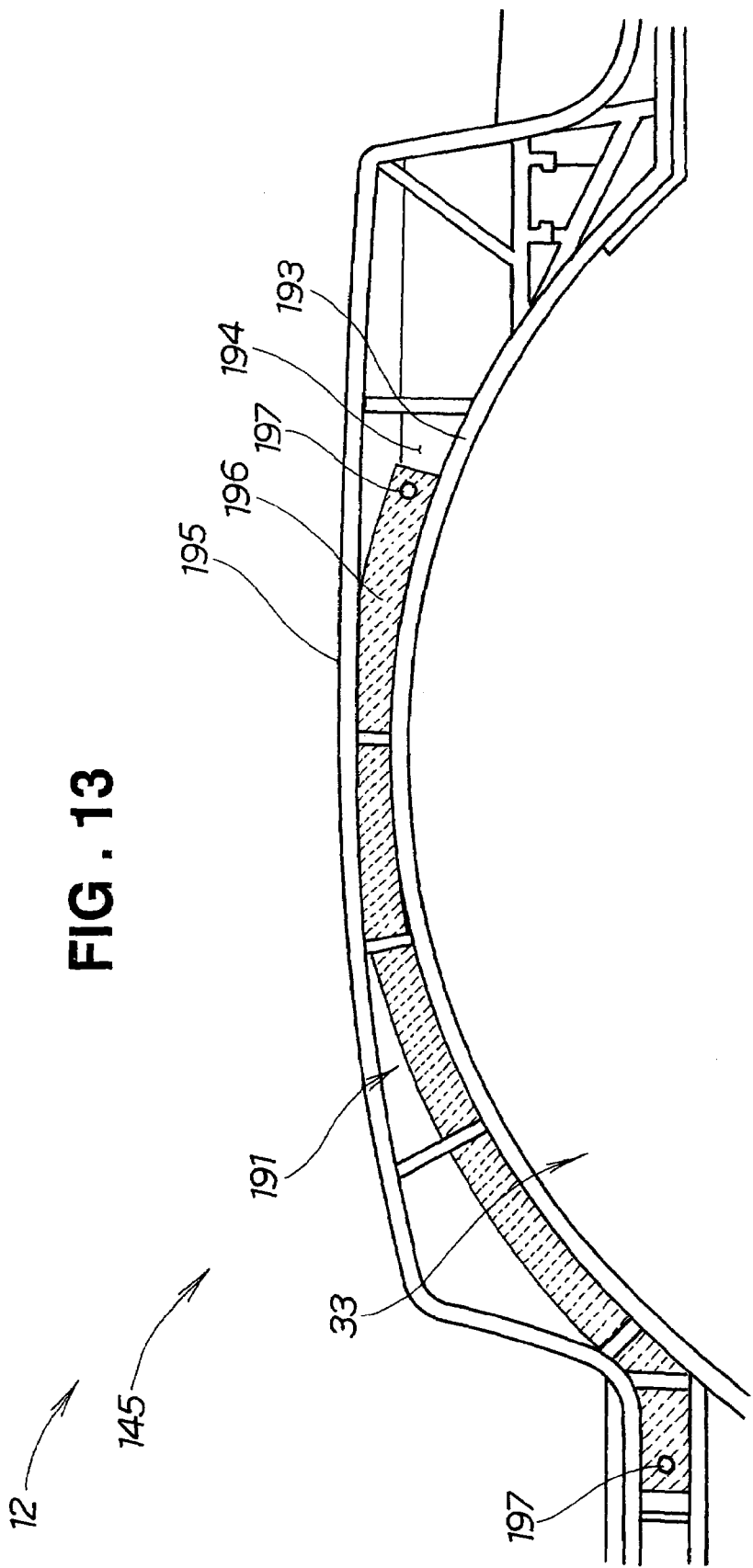
FIG. 13 is a view showing a side guard part of a housing proper according to the invention.
Figure 14:
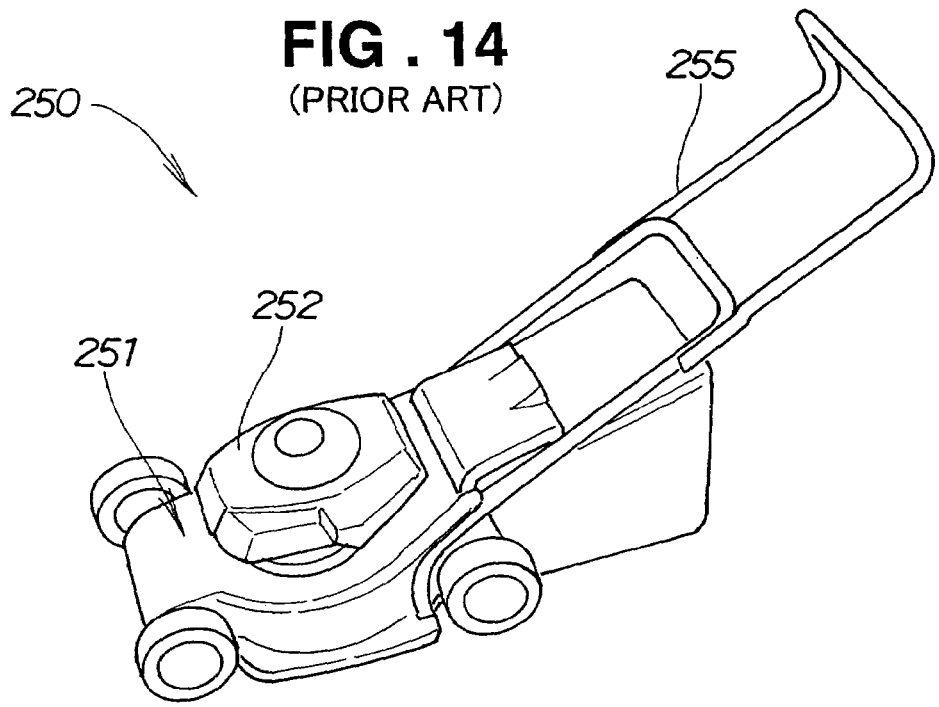
FIG. 14 is a perspective view showing a conventional lawn mower.
Figure 15:
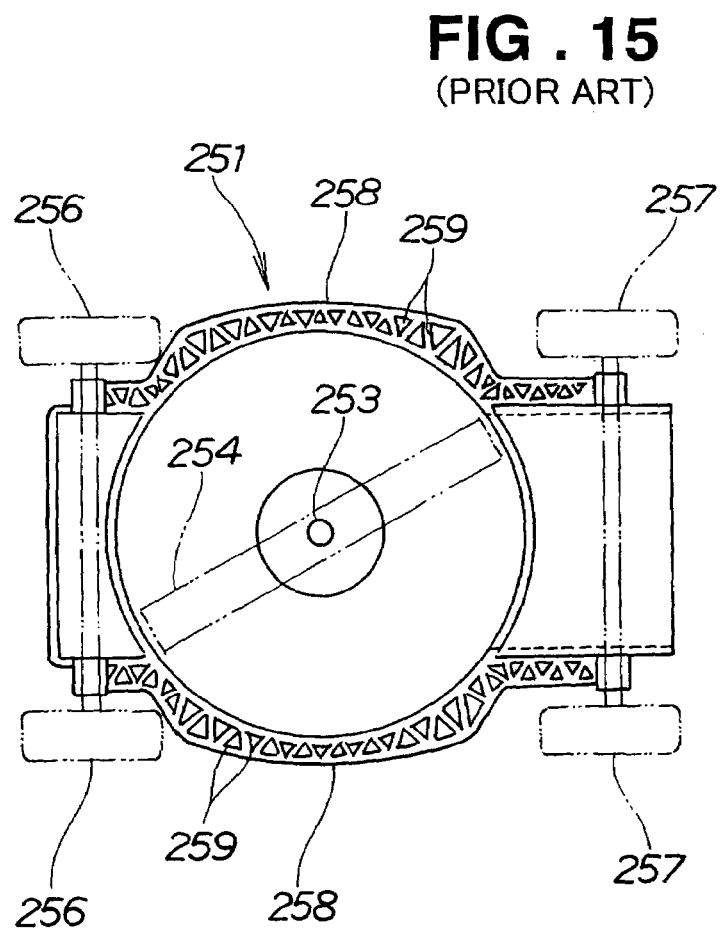
FIG. 15 is a bottom view of a cutter housing shown in FIG. 14.

As shown in FIG. 11, FIG. 12 and FIG. 13, the left side guard part 145 includes the hollow reinforcing part 191 and a vertical side guard wall 195.

The hollow reinforcing part 191 is made up of the curved side wall 193 of the scroll part 33 (see FIG. 10), an approximately horizontal or upper guard wall 194 extending outward from the lower end vicinity of the curved side wall 193 and in the front-rear direction, and a connecting rib 196 interposed between the curved side wall 193 and the horizontal upper guard wall 194 and extending in the front-rear direction. The vertical or side guard wall 195 extends downward from the horizontal or upper guard wall 194 and in the front-rear direction. As shown in FIGS. 10–12, the mid-portion of the vertical (side) guard wall 195 is closer to the curved side wall 193 than the front and rear portions thereof (FIG. 10) so that the connecting rib 196 is connected between the curved side wall 193 and the vertical (side) guard wall 195 in the vicinity of the mid-portion (FIG. 12) and is connected between the curved side wall 193 and the horizontal (upper) guard wall 194 at front and rear portions of the vertical side guard wall 195 (FIG. 11).

By a pipelike reinforcing part 191 being constructed to include the vertical guard wall 195 like this, the protrusion of the left side guard part 145 can be made small, the cutter housing 12 (see FIG. 10) can be made slim, and the width of the lawn mower 10 (see FIG. 1) can be made small.

As explained above, the cutter housing 12 is a member made of a synthetic resin. This cutter housing 12 has side guard parts 145, 146 (see FIG. 10 for 146) on left and right peripheries of a scroll part 33, and each of the left and right side guard parts 145, 146 has an approximately horizontal or upper guard wall 194 extending outward from the lower end vicinity of the curved side wall 193 of the scroll part 33 and in the front-rear direction, a vertical or side guard wall 195 extending downward from the horizontal or upper guard wall 194 and in the front-rear direction, and a connecting rib 196 connecting together the curved side wall 193 and the horizontal or upper guard wall 194 and extending in the front-rear direction, and the curved side wall 193, the horizontal or upper guard wall 194 and the connecting rib 196 form a hollow reinforcing part 191 at the lower end vicinity of the side wall 193.

Consequently, the resistance of the cutter housing 12 to impacts from the side can be increased, and the length-direction bending rigidity of the cutter housing 12 can also be increased. As a result, it is possible to increase the overall rigidity of the lawn mower.

Although in the foregoing preferred embodiment an example was shown in which hollow reinforcing parts 191, 192 were formed on left and right peripheries of the scroll part 33 on the cutter housing 12, as shown in FIG. 10, the invention is not limited to this, and alternatively a hollow reinforcing part may be formed on the front or the rear of the cutter housing, or a hollow reinforcing part may be formed continuously all the way around the cutter housing 12.

Obviously, various minor changes and modifications of the present invention are possible in the light of the above teaching. It is therefore to be understood that within the scope of the appended claims the invention may be practiced otherwise than as specifically described.

What is claimed is:

1. A lawn mower, comprising:
   a cutter housing having a scroll part;
   a motive power source mounted on the cutter housing and having a rotationally driven output shaft; and
   a cutter blade attached to an end of the output shaft of the motive power source and rotationally driven thereby inside the scroll part of the cutter housing,
   wherein the cutter housing is made of a synthetic resin and has side guard parts on left and right peripheries of the scroll part,
   wherein each of the side guard parts is made up of a substantially horizontal guard wall extending outward from a lower end vicinity of a side wall of the scroll part and in the front-rear direction of the lawn mower, a vertical guard wall extending downward from the horizontal guard wall and in the front-rear direction, and a connecting rib connected between the side wall and horizontal guard wall and between the side wall and the vertical guard wall and extending in the front-rear direction along the side wall, and
   wherein the side wall, the horizontal guard wall, the vertical guard wall and the connecting rib form a hollow reinforcing part at the lower end vicinity of the side wall and extending in the front-rear direction along the side wall.

2. A lawn mower according to claim 1; wherein the hollow reinforcing part is gas-filled.

3. A lawn mower comprising: a cutter housing having a curved side wall defining an interior space; a power source mounted on the cutter housing for rotationally driving an output shaft; and a cutter blade disposed in the interior space and connected to be rotationally driven by the output shaft; wherein the cutter housing is formed of synthetic resin and has side guard parts on left and right outer sides of the curved side wall, each side guard part having an upper guard wall extending outwardly from a lower portion of the curved side wall and extending in the front-rear direction of the lawn mower, a side guard wall extending downwardly from the upper guard wall in spaced relation from the curved side wall and extending in the front-rear direction, and a connecting rib connected between the curved side wall and the upper guard wall and connected between the curved side wall and the side guard wall and extending in the front-rear direction; and wherein the curved side wall, the upper guard wall, the side guard wall and the connecting rib of each side guard part define an enclosed hollow reinforcing structure that extends in the front-rear direction along the lower portion of the curved side wall.

4. A lawn mower according to claim 3; wherein the cutter housing, including the side guard parts, is a one-piece molded structure.

5. A lawn mower according to claim 3; wherein the side guard wall of each side guard part is disposed closer to the curved side wall at a mid-portion of the side guard wall in the front-rear direction thereof than at other portions thereof.

6. A lawn mower according to claim 5; wherein each connecting rib is connected between the curved side wall and the side guard wall, and is not connected between the curved side wall and the upper guard wall, in the vicinity of the mid-portion of the side guard wall.

7. A lawn mower according to claim 6; wherein each connecting rib is connected between the curved side wall and the upper guard wall, and is not connected between the curved side wall and the side guard wall, at front and rear end portions of the side guard wall.

8. A lawn mower according to claim 5; wherein each connecting rib is connected between the curved side wall and the upper guard wall, and is not connected between the curved side wall and the side guard wall, at front and rear end portions of the side guard wall.

9. A lawn mower according to claim 5; wherein the enclosed hollow reinforcing structure of each side guard part is gas-filled.

10. A lawn mower according to claim 3; wherein the enclosed hollow reinforcing structure of each side guard part is gas-filled.

* * * * *